United States Patent

Urbanski et al.

Patent Number: 6,113,079
Date of Patent: Sep. 5, 2000

[54] ADJUSTABLE CIRCUMFERENCE FRACTIONATION TRAY AND METHOD OF INSTALLATION

[75] Inventors: Nicholas F. Urbanski, Depew; Thomas C. Heldwein, Lockport; Lawrence S. Graczyk, Orchard Place; Michael R. Resetarits, Depew, all of N.Y.

[73] Assignee: UOP LLC, Des Plaines, Ill.

[21] Appl. No.: 09/275,281

[22] Filed: Mar. 24, 1999

[51] Int. Cl.$^7$ ...................................................... B01F 3/04
[52] U.S. Cl. ........................... 261/114.5; 202/158; 29/428
[58] Field of Search ............. 261/97, 113, 114.1–114.5; 202/158; 29/428

[56] References Cited

U.S. PATENT DOCUMENTS

| | | | |
|---|---|---|---|
| 1,811,627 | 6/1931 | Heid | 261/114.1 |
| 2,540,781 | 2/1951 | Glitsch | 261/114.5 X |
| 2,611,596 | 9/1952 | Glitsch | 261/114.5 |
| 2,836,406 | 5/1958 | Nutter | 261/114.5 X |
| 2,998,234 | 8/1961 | Haselden | 261/113 |
| 3,233,708 | 2/1966 | Glitsch | 261/113 X |
| 3,410,540 | 11/1968 | Bruckert | 261/113 |
| 3,759,497 | 9/1973 | Black | 261/114.5 X |
| 4,120,919 | 10/1978 | McClain | 261/114.5 |
| 4,133,852 | 1/1979 | DiNicolantonio et al. | 261/114.5 |
| 4,159,291 | 6/1979 | Bruckert et al. | 202/158 X |
| 5,407,605 | 4/1995 | Resetarits et al. | 261/98 |
| 5,573,714 | 11/1996 | Monkelbaan et al. | 261/114.5 |

FOREIGN PATENT DOCUMENTS

| | | | |
|---|---|---|---|
| 146391 | 2/1981 | Germany | 261/114.5 |

OTHER PUBLICATIONS

* Reference Checked Was Cited by Applicants in Specification.

Primary Examiner—Richard L. Chiesa
Attorney, Agent, or Firm—John G. Tolomei; John F. Spears, Jr.

[57] ABSTRACT

A novel fractionation tray (1) includes slidable decking plates (4) located between and alongside parallel downcomers (2). The decking plates located between a pair of downcomers have sections which may be extended outward toward the edge of the tray to adapt the shape of the tray to the internal shape of the column in which it is installed. A method of installing the trays, with an upper tray being supported only by a lower tray, is also disclosed.

12 Claims, 2 Drawing Sheets

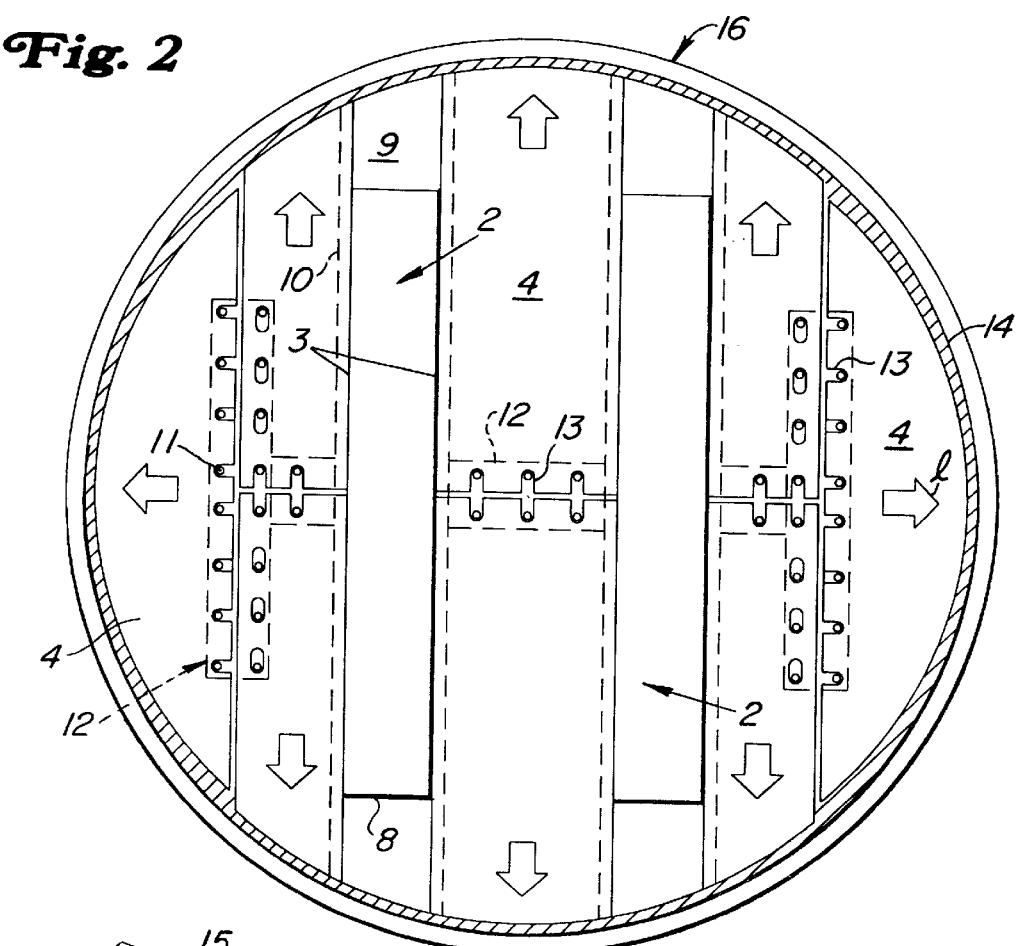
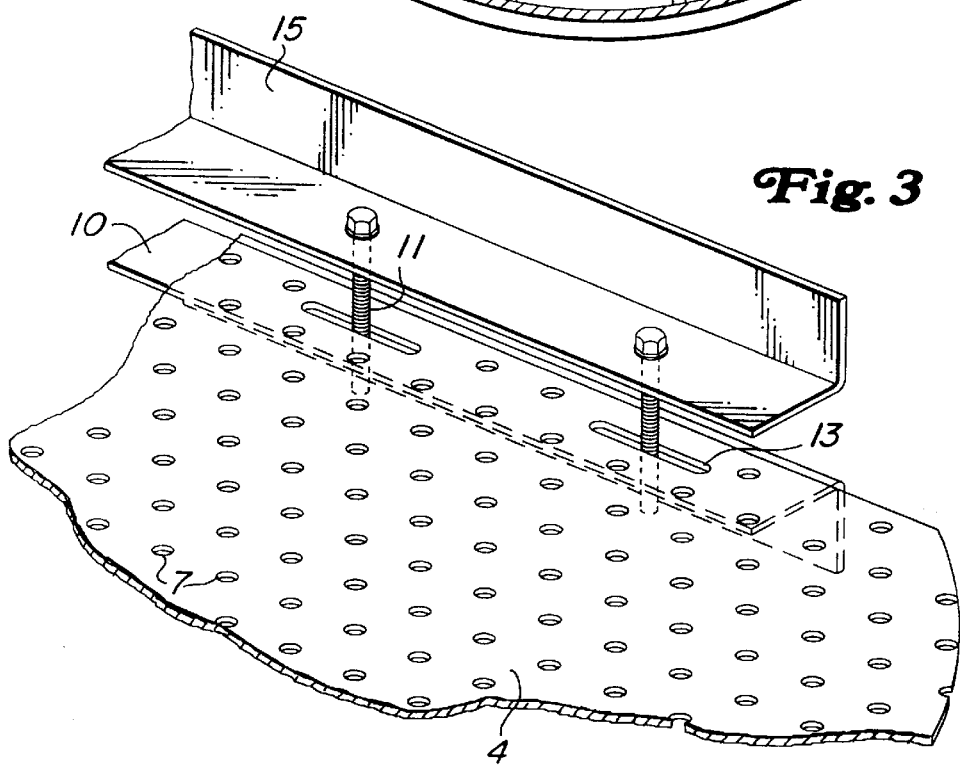

ADJUSTABLE CIRCUMFERENCE FRACTIONATION TRAY AND METHOD OF INSTALLATION

FIELD OF THE INVENTION

The invention is a novel fractionation tray for use in distillation columns which separate volatile chemical compounds via fractional distillation. The invention more specifically relates to the structure of the decking section of new fractionation trays which are being installed during the revamping of an existing fractionation column.

BACKGROUND OF THE INVENTION

Fractionation trays are widely used in the petrochemical and petroleum refining industries to promote the multistage vapor-liquid contacting performed in fractional distillation. They are mounted in a horizontal position in a vertical pressure vessel referred to as a fractionation column. The normal configuration of a fractionation column includes about 10 to 120 individual trays. Normally each tray is the same. The trays are mounted horizontally at uniform vertical distances referred to as the tray spacing of the column. This distance may vary within different parts of the column but is normally considered constant. The trays are normally supported in part by rings attached to the inner surface of the column, with an overlap providing a seal at the edge of the tray.

Vapor generated at the bottom of the column rises through the tray, which supports a quantity of liquid. The passage of the vapor through the liquid generates a layer of bubbles referred to as froth. The high surface area of the froth helps to quickly establish a compositional equilibrium between the vapor and liquid phases on the tray. The vapor loses less volatile material to the liquid and thus becomes slightly more volatile as it passes upward through each tray. The liquid separates from the froth and travels downward to the next lower tray. This froth formation and separation is performed on each tray. Trays therefore perform the two functions of contacting the rising vapor with liquid and then allowing the two phases to separate and flow in different directions. When the steps are performed a suitable number of times, the process can lead to highly effective separation of chemical compounds based upon their relative volatility.

RELATED ART

The long and extensive use of fractionation trays has led to the development of many different designs for trays and of different methods of supporting them in a column. Examples of fractionation trays include the multiple downcomer design shown in U.S. Pat. No. 3,410,540 issued to W. Bruckert. This reference shows the preferred box-like downcomer design preferably used in the subject apparatus and also describes several different possible mechanical arrangements of the tray such as the liquid sealable outlet means present at the bottom of the downcomer U.S. Pat. No. 5,407,605 issued to M. R. Resetarits, et al. illustrates alternative constructions of the parallel downcomers which may be employed on a multiple downcomer fractionation tray including the use of V-shaped downcomers separated by planar decking areas.

U.S. Pat. No. 3,233,708 issued to M. C. Glitsch illustrates details of fractionation tray deck construction. This reference shows adjacent tray sections having edge portions which are offset downwardly to support the adjacent tray section together with frictional fasteners for clamping the tray sections. This is described as a means to accommodate the movement of tray sections upon thermal expansion and contraction while minimizing the loss of available area for vapor openings.

U.S. Pat. No. 5,573,714 issued to D. R. Monkelbaan, et al. also shows details of the construction of fractionation tray decking. FIG. 4 shows the overlap of a portion of one tray decking section over an adjoining section and how these are connected to an underlying splice plate. The patent also shows the use of several separate decking sections to fill the decking area between the parallel downcomers of the tray.

SUMMARY OF THE INVENTION

The invention is a novel apparatus for use in a fractionation column employed in the separation of volatile chemical compounds. The invention provides a fractionation tray having a variable circumference such that the overall circumference of the tray and the shape of the tray can be adjusted to fit the contour of the inner surface of the fractionation column. This is useful when the column wall is not a perfect cylinder and provides several advantages when installing new trays including greater ease in installing the new trays and the ability to provide the optimum gap between the outer edge of the column and the column wall. The invention is characterized by the provision of slidable decking sections which allow the shape and dimensions of the outer periphery of the tray to be adjusted as needed to fit the inner surface of the fractionation column. The circumference of the tray can therefore be adjusted to match the roundness or out of roundness of the column. The trays of the invention also include a mechanism for securing the decking sections into place after assembly of the tray is complete.

One embodiment of the subject invention may be characterized as a discoid apparatus for use in the fractionation distillation of volatile chemical compounds while mounted horizontally within a vertical fractionation column, which apparatus comprises a plurality of parallel downcomers and slidable decking sections located between and adjacent the downcomers, with the decking sections being held in place by a lockable retention mechanism which allows the location of the decking sections to be adjusted to alter the perimeter of the apparatus.

BRIEF DESCRIPTION OF THE DRAWINGS

FIG. 2 is an overhead view of a tray having two downcomers (2) and slidable decking panels (4) which may be moved in the direction of the arrowheads at the edge of the tray.

FIG. 3 is a simplified view of a decking clamp down angle (15) in position to retain a section of decking (4).

DETAILED DESCRIPTION AND PREFERRED EMBODIMENTS

Figure 1:
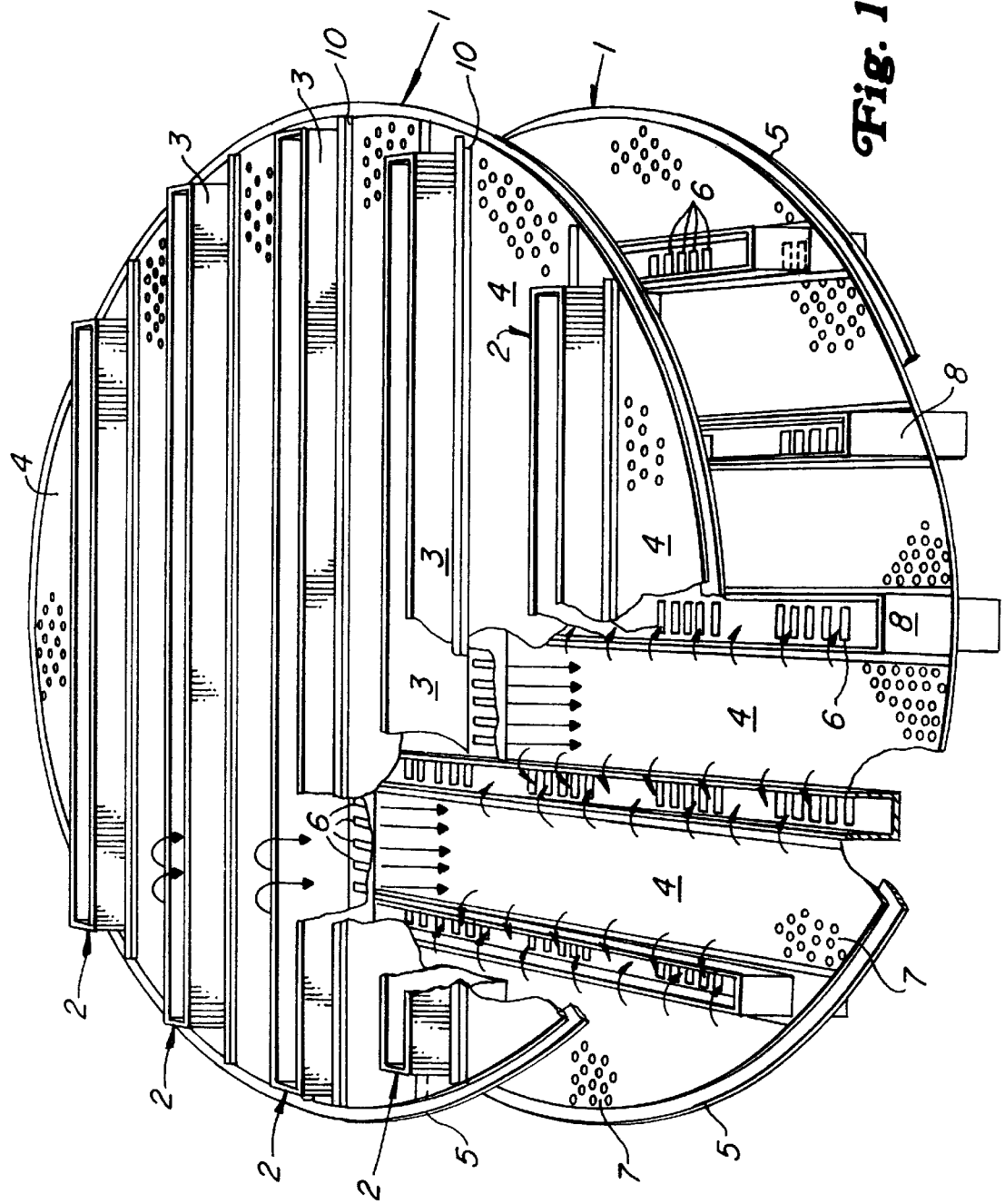
FIG. 1 is an isometric view of two multiple downcomer trays mounted within a fractionation column.

Fractionation columns are used in the separation of a wide variety of chemical compounds in the petroleum refining, petrochemical and chemical industries. They are used for instance in the separation of various paraffinic hydrocarbons such as the separation of butanes and pentanes, in removing contaminants including water from hydrocarbon streams and in the separation of various alkyl aromatic hydrocarbons such as the separation of toluene from xylenes. Fractionation trays are also used for the separation of oxygenates such as ethers or alcohols from hydrocarbons, the separation of inorganics such as halogenated compounds, fluorocarbons and elemental gases and other separations too numerous to mention. Fractionation columns and trays therefore have great utility in many industries.

The inventive concept resides in the structure of the vapor-liquid contacting apparatus employed within the column and thus the external lines, outer vessel and external equipment of the overall fractionation column do not form a part of the invention or a limitation to the invention. However, a generalized description of fractional distillation is useful to ensure an understanding of the use and structure of the invention. Upon entering the fractionation column, the chemical compounds are separated by volatility, with the more volatile compounds entering a vapor phase which rises through the column via the perforations in the trays. The most volatile compound(s) of the feedstream to the column are gradually concentrated into an overhead vapor stream which exits the upper end of the fractionation column through an overhead vapor line. The overhead vapor stream passes through the overhead condenser wherein indirect heat exchange results in the condensation of at least a sizeable portion of this stream prior to passage into an overhead receiver. Liquid is withdrawn from the overhead receiver and divided into a net overhead product stream removed from the column and a reflux stream returned to the column. The returning liquid-phase reflux material is preferably distributed in a uniform manner over the cross-section of the column by means of a distributor. The reflux liquid flows onto a topmost fractionation tray and then enters the downcomers distributed across the tray. The liquid phase flows downward through the column gradually changing in composition. The liquid phase resides on the decking, partially as froth, and in the downcomers. There is removed at the lowermost end of the column a stream of liquid phase material referred to as the bottoms liquid. This liquid contains the least volatile components of the feed. The bottoms liquid is divided into a first portion which is removed from the separation process as the net bottoms stream and a second portion which is passed into a reboiler. Heat energy is added to this reflux stream in the reboiler, typically causing at least partial vaporization and some heating of the liquid flowing through this line. The thus formed reboiling material is then passed into the bottom of the fractionation column adding the necessary heat and vapors to the bottom of the column to perform fractional distillation.

Fractionation columns are often revamped in order to increase the capacity or the separation effectiveness of the column. If the column contains fractionation trays, the revamp normally involves modifications to the fractionation tray systems. These modifications may include the installation of a completely different type of fractionation tray, the installation of a different number of fractionation trays or a combination situation in which an increased number of a different type of fractionation tray is installed in the column.

Revamping of the fractionation column is a labor intensive situation which must occur within a short turnaround time and within the close confines of the column. The assembled trays are normally too large to be passed into the column through any available opening such as a manway and therefore must be assembled within the column from a number of small pieces. The fact that the removal of the old trays and the installation of the new trays must occur within these close confines increases the time necessary for the revamping procedure. This in turn results in the column being out of service for a longer time and the overall petrochemical or petroleum refining unit in which the column is employed also being out of service for at least this same period of time. It is therefore desirable to develop systems which lead to faster and more economical revamping of fractionation columns and it is an objective of the subject invention to provide such a system. It is a further objective of the invention to provide fractionation trays which may be more easily and quickly installed into columns having a variable internal shape.

A recent development in column revamping is a method of installing additional trays without the installation or movement of support rings on the wall of the column. Existing tray support rings are employed to the maximum extent possible, with trays resting on these rings supporting one or more other trays. As there is no support ring to mate with the edge of the tray-supported trays, the gap between the circumference of a conventional circular tray and the wall of the vessel may be variable and excessive. The subject invention is specifically directed to use in this type of column retrayings. It may however be used in new columns or with other column retraying techniques. One such situation exists when only a partial support ring is present in the column. The subject invention may be used on only the portion of the trays which aligns with the gap in the support ring structure.

Preferably each of the trays in a major section of the column has a similar structure. However, there is no set requirement in the subject invention for each of the vertically adjacent trays to have an identical structure. The trays may differ in a minor regard such as the relative amount of decking versus downcomer inlet area provided on a tray, or the size and distribution of the vapor perforations or passageways in the decking area, the construction of the decking area due to some trays being supported from below (not receiving support from the column rings) or by the presence or absence of various mechanical stiffeners, connection devices, etc. Vertically adjacent trays may also be significantly different, such that a lower tray may comprise the preferred rectangular or trough-like downcomer while an upper trays would comprise an alternative V-shaped downcomer.

The subject invention finds particular utility with multiple downcomer type trays. The structure of this type of tray with its parallel downcomers spread across the surface of the tray is highly adaptable to the invention without the addition of significant additional structure.

Referring now to FIG. 1, the figure shows two multiple downcomer fractionation trays as such may be used in the practice of the preferred embodiment of the subject invention. The structural details which allow for the movement of decking sections are not shown on this figure due to the already complex nature of the figure. The trays are normally mounted in a column not shown in the illustrated transverse arrangement. The trays are of similar construction but are rotated about the vertical axis of the column such that the downcomers (2) of the upper tray (1) are transverse of the downcomers (2) of the lower tray (1). This is the preferred arrangement of multiple downcomer trays within a column. Each tray has five downcomers (2), with the trough-like downcomers being formed by two sidewalls (3) and two endwalls (8). A portion of the downcomer projects both above and below the surface of the tray as defined by the planar decking sections (4).

Each tray has decking arranged in six different areas, with four of these areas being located between parallel downcomers and two of the areas being located at the opposite extremities of the tray. Each tray rests upon a support ring (5) which is attached to the inner surface of the wall of the column (not shown). A support angle (10) or other structural member preferably extends along the length of each downcomer sidewall (3) to provide increased rigidity and to support the decking sections. The decking support angle (10) preferably extends outward to the support ring (5).

FIG. 1 illustrates the flow of liquid upon the trays and downward through the column. The liquid flow is shown by the dark arrows spread across the drawing. The arrows show the liquid flows across the upper edge of the sidewall of the downcomer from the decking section and into the upper open end of the downcomer. The material entering the upper end of the downcomer is actually a mixture of vapor and liquid, sometimes referred to as froth. This separates within the downcomer to form a layer of clear liquid which is retained, during proper operation, in the bottom section of the downcomer. The clear liquid is allowed to drain from the downcomer through the openings (6) provided at specific locations in the bottom plate of the downcomer. These openings (6) are located such that the liquid falls upon a decking section (4) of the immediately lower fractionation tray. The liquid therefore is not allowed to fall directly into the upper open end of the downcomers of the next lower tray. The transverse orientation of the downcomers on vertically adjacent trays facilitates this passage of the liquid onto decking rather than into downcomers. A perpendicular orientation of the downcomers on vertically adjacent trays is not required, and the downcomers may be set at different angles, such as 60°, if there is proper adjustment on the size and location of the openings (6) in the bottom of the downcomers.

FIG. 2 illustrates an embodiment of the invention in which the fractionation tray comprises two parallel downcomers (2) and three decking areas. FIG. 2 also illustrates mechanical details of one retention mechanism which may be employed to hold the slidable decking sheets in place. The layout and general shape of the tray components shown in this figure represents a preferred arrangement for one specific situation. Many factors dictate the number, size and shape of the tray components. For instance, the projected liquid flows and diameter of the column will to a great extent set the number of downcomers employed in the tray. The spacing and opening size of the perforations in the decking is also subject to variation to accommodate the tray's variable vapor traffic.

The degree to which it is desired to adjust the circumference of tray will lead to changes in the size and number of the sliding deck sections. If only a minor adjustment is believed required then the number of movable decking sections can be reduced. In the figure two decking sections between the downcomers are each shown as being movable toward the outer edge of the tray. However, a single moving deck section could also be used with the neighbor stationary. Further variation is possible in the location of the joint between the movable sections or between the movable sections and any conventional "fixed" section located between the same downcomers. The arrangement shown in the figure is preferred for small diameter trays, but for large diameter trays several decking sections could be located between the downcomers, with some of them being fixed and only the two terminal sections being movable.

Similar to the tray of FIG. 1 each downcomer comprises two end walls (8) and two parallel sidewalls (3). These walls preferably extend both above and below the level of the tray defined by the decking (4). Each decking area is comprised of multiple sheets of decking material which are slideably engaged upon the decking support angles (10) which run along the outer side of the downcomer sidewall (3). The size of decking sections is determined by such practicalities as the size of the openings available in the wall of the surrounding fractionation column through which the pieces are passed. This is necessary because the trays are typically assembled within the fractionation column after it is erected at the site. The various pieces which form the fractionation tray must therefore be small enough to pass through a manway or other opening and also be maneuverable within the limited confines of the column. Besides the perforated decking sections, a tray of this nature would typically comprise perforated or imperforate end plates (9) extending between the end wall (8) of the downcomer (2) and the outer edge of the tray.

The decking in the central section of the tray of FIG. 2 is comprised of two sheets of decking while the decking located on each of the terminal or crescent shaped sections at the periphery of the tray is comprised of at least three pieces of decking. The outermost decking piece could itself comprise two individual sections which meet at the line "I". In the prior art the corresponding fixed pieces of decking were placed on the available supports and then fastened into place through the use of bolts or other appropriate fasteners. In the subject invention, the movable decking pieces preferably have engagement slots (13) located at their abutting edge such that the decking sections may be moved and positioned in a manner to correspond to the internal shape of the column (16). In this manner the decking sections (plates) are moved outward in the direction of the arrowheads placed upon the decking sections in a manner which allows adjustment, normally an increase in the diameter of the fractionation tray. The movable decking sections on the two terminal deck sections on opposite sides of the tray thus move perpendicular to the downcomer. The gap (14) between the inner surface of the cylindrical wall (16) of the fractionation column and the outer edge of the fractionation tray is therefore adjustable and with proper design may be brought down to the desired width.

There is no requirement that movement of the slidable decking sections is limited to directions parallel to or perpendicular to the downcomers. The decking sections in the two terminal sections can be fabricated to allow diagonal movement or movement at a variable angle to the downcomer. The multiple sections in a terminal crescent areas of the tray can move independently different directions.

The decking sections are laid in place upon the decking supports (10) and other structural means provided and moved as needed. They are then fixed in place with the fasteners (11). The fasteners (11) will typically be a nut and bolt type assembly with suitable washers or overlaying flange to engage the decking and allow it to be secured in place by tightening the nut. The joints between decking sections preferably overlap a splice plate (12) located below the decking. More information on the use of splice plates for support of decking may be obtained by reference to U.S. Pat. No. 5,573,714, which is incorporated herein for its teaching in regard to the construction of fractionation tray decking and fractionation trays in general.

Splice plates or other structural members may extend between adjacent downcomers at a number of points. Several decking sections can be located between two adjacent downcomers, with this becoming more common as the length of the downcomer increases. The decking sections located in the central area of the tray may therefore be fixed in place with conventional decking attachment means. The joints between the movable section(s) and the stationary sections would then be located nearer the ends of the downcomer.

One embodiment of the invention may therefore be characterized as a method of installing trays in a fractional distillation column, which method comprises: installing a first tray in the column, with the first tray being supported, at least in part, by a ring attached to the inner surface of the column; installing a second tray in the column by assembling the second tray within the column, with the entire second tray being supported only by the first tray; adjusting the shape of the periphery of the second tray to conform to the shape of the column by sliding decking portions toward or away from the column wall; and fixing the decking portions in place.

The previously cited U.S. Pat. No. 3,233,708 illustrates the provision of relatively small "semi-circular recesses" at the edge of the decking sections to accommodate thermal expansion. The location adjustment slots or other means to allow adjustment of the decking employed in the subject invention must provide a much greater freedom of movement on the order of one to three inches or more. Another way of comparing this difference to the patent is to note that the recess for attachment of the decking provided by the patent is shown to be approximately the same diameter as the vapor flow perforations in the decking. In the subject apparatus a slot used to allow movement of a decking plate has to be many times longer than the vapor perforation diameter, e.g. 10 to 35 diameters or more. These slots may be aligned at an angle to the edge of the decking piece to increase the freedom of movement of the decking. The size of the slots shows that they are dedicated to functioning as an adjustment means separate from other perforations on the tray.

While FIG. 2 shows the provision of slots which allow the movable panels to be fastened in a variety of positions along the length of the downcomer and across the splice plates, this is not required as other mechanisms may be employed. For instance, the edge of the decking sections near the downcomer could be sandwiched between a bottom support fixedly attached to the downcomer sidewall and an overlaying flange. A gap left between the edge of the decking panel and the sidewall can be used to accommodate bolts passing through only the support and the flange such that tightening the bolts will compress the two elements locking the panel between them. Other simple mechanical means to fix the decking in place are available. For instance, the position of the splice plates or other supporting elements extending horizontally across the space between the downcomers can also be adjustable. An examination of the edge of the tray shown in FIG. 2 reveals that the edge of the tray is irregular. The width of the gap indicated by the cross hatching varies and there are discontinuities at the junction of the deck pieces. This feature distinguishes the subject apparatus from prior art designs which will allow movement of the plates but form a smooth edge, round tray.

FIG. 3 illustrates another of the several mechanisms that can be employed to retain the movable decking section (4) in place after its positioning in the column. The decking section is sandwiched or clamped between the deck clampdown angle (15) and the lower decking support angle (10), which is fastened to the vertical wall (not shown) of a downcomer. The position of the upper angle (15) along the length of the downcomer may be adjustable or it may be fixed in preset locations. The decking section is movable in either instance because of the provision of the elongated engagement slots (13) which allow movement of the decking until clamped into position by tightening of the bolts (11).

As another mechanical variation of movable decking sections, the terminal decking sections (those nearest the edge of the tray) and a splice plate or other support could be designed as a single module which can be positioned along the length of the downcomer sidewall. A number of bolt holes spaced along the wall could be provided to allow the entire module to be attached at a number of locations. The use of the slidable sandwich structure described just above would accommodate this movement.

While a small opening on the tray surface may be tolerable, no sizable unsealed gap should be left between the edges of two deck sections. Any gap between moveable sections must be accommodated either by an adjustable connection such as two overlapping decking sections or by an intermediate decking section of the proper size. If overlapping decking sections are employed, then it is preferred that the edge portion of one section is contoured (bent) to provide a lower level lip which will support the edge of the adjacent decking section such that the top surface of both active decking sections lay in the same plane.

It is customary in the art to totally seal any gap at the edge of the column by means of an underlying support ring. The edge of the tray rests upon this support ring which is typically welded to the inside surface of the column wall. The subject tray may be used in this manner or a gap may exist between the edge of the tray and the column wall. The subject tray allows the width of this gap to be set to a preferred or possibly minimized dimension.

As previously mentioned, the subject invention finds particular utility with multiple downcomer trays such as described in the previously cited U.S. Pat. No. 3,410,540. Multiple downcomer trays have several distinguishing physical characteristics. For instance, a multiple downcomer tray does not have a "receiving pan". This is the normally imperforate section located below an outlet downcomer opening. It is the imperforate area of a tray upon which the liquid descending through the downcomer impacts before passing horizontally onto the decking of the tray. Receiving pans are normally located directly below the downcomer leading from the next above conventional fractionation tray. The horizontal decking surface area of the preferred embodiment of a multiple downcomer fractionation tray is divided into depressed areas functioning as downcomer means and flat vapor-liquid contacting area normally referred to as decking. There are no imperforate areas allocated to receiving descending liquid from the tray located immediately above.

Another distinguishing feature of a typical multiple downcomer type fractionation tray is the provision of a relatively large number of parallel downcomers evenly spaced across the tray. Each tray can employ from one to fifteen or more downcomers. These downcomers are spaced relatively close together compared to the downcomers of crossflow fractionation trays as they are spread across the surface of the tray rather than just being at the periphery of the tray. The distance between adjacent downcomers (measured between their side walls) of a multiple downcomer tray will be between 0.2 and 2.0 meters and is preferably less than 0.5 meter. This results in a tray having a unique design consisting of the alternating decking areas and downcomer means evenly spaced across the upper surface of the fractionation tray as shown in FIG. 1.

The downcomers of a multiple downcomer-type tray are also unique compared to the downcomers employed upon conventional crossflow fractionation trays. The downcomer means do not normally extend downward all the way to the next fractionation tray. Rather they stop at a much higher intermediate level located in the void volume between the two trays. The downcomer descending from the tray above therefore customarily stops well above the deck surface of the lower tray and the inlet to the downcomers of the tray below. Thus there is no inlet weir at the bottom of the downcomer of the tray as there is on a crossflow tray.

Another distinguishing feature of a multiple downcomer fractionation tray is the provision of a liquid sealable outlet means near the bottom of the downcomer. The bottom of the downcomer is partially closed off to retard the direct downward flow of liquid out of all of the downcomer. This causes the intentional accumulation and retention of sufficient froth to allow the froth to separate into clear liquid and vapor. This liquid sealable outlet is located well above the deck of the tray located immediately below and is preferably at a level above the inlet of the downcomers associated with this next lower tray. The clear liquid is collected in the lower portion of the downcomer and spills forth upon the next lower tray through openings in the bottom of the downcomer. Some liquid may, if desired, also exit through openings in the downcomer side walls. The openings are grouped together and located such that the existing liquid does not fall into a downcomer of the next lower tray. Details on various constructions of the liquid sealable outlet means for rectangular downcomers may be obtained by reference to U.S. Pat. No. 4,159,291 which is incorporated herein for its teaching in regard the construction of rectangular downcomers, decking material and the liquid sealable outlets of the downcomers.

The deck portions between any downcomers on the tray is preferably substantially planar, that is flat, and orientated in a horizontal plane. These decking portions are preferably provided with uniformly distributed openings of adequate total cross-sectional open area to allow the expected vapor flow to pass upward through the tray at a suitable velocity and pressure drop. Uniform circular openings of a standard sieve tray are preferred but can be supplemented by vapor flow directing slots. The open area provided by deck perforations may vary from 5 % to as high as 30–45 % of the tray deck area. The circular perforations are often about 0.8–1.3 cm (0.19–0.50 in) in diameter and may be up to 1.87 cm (0.75 in) in diameter. Multiple downcomer trays are often installed with a tray spacings of about 25 to 50 cm (10–20 inches).

The apparatus according to the present invention can be in the form of a new apparatus or a modification to an existing apparatus. That is, an existing trayed column may be modified to employ the subject invention.

One embodiment of the invention may accordingly be characterized as an adjustable periphery fractionation tray for installation in a vertical fractionation column having an upper first end and lower second end and used for the separation of volatile chemical compounds by fractional distillation, which tray comprises a first and a second trough-like downcomer; two movable perforated decking sections mounted on supports fastened to the downcomers and located between the first and second downcomers, with the decking sections having positioning slots located in portions of the decking sections which overlies the supports; and a retention mechanism which locks the decking sections in place along the supports.

A further embodiment of the invention may be characterized as an apparatus for performing fractional distillation, which apparatus comprises: a vertical enclosed column and a plurality of fractionation trays suspended in the column, with each tray comprising at least two parallel downcomers; decking support means attached to the downcomer; planar perforated decking panels located between two parallel downcomers and resting upon the decking support means, with at least one of the decking panels being a movable decking panel which is configured to allow movement in the direction of the major axis of the downcomers; and fasteners which retain the movable decking panel in place, with the outermost decking panels having an edge facing the inner surface of the column and separated from the inner surface of the column by an irregular unsealed gap.

What is claimed:

1. A discoid apparatus for use in the fractionation distillation of volatile chemical compounds while mounted horizontally within a vertical fractionation column, which apparatus comprises:

a) a plurality of parallel downcomers; and b) slidable horizontal decking sections located between and adjacent the downcomers, with the decking sections held in place by a lockable retention mechanism which allows the location of the decking sections to be adjusted to alter the irregular circumference of the apparatus.

2. The apparatus of claim 1 wherein decking sections located between adjacent downcomers have elongated retention slots which allow the placement of the decking sections to be adjusted longitudinally along the length of the downcomer.

3. The apparatus of claim 2 wherein the decking sections are held in place by a bolting mechanism.

4. The apparatus of claim 1 wherein two slidable decking sections are located between a pair of adjacent downcomers.

5. The apparatus of claim 4 comprising a decking section which may be moved perpendicular to a downcomer.

6. The apparatus of claim 1 wherein the downcomers comprise parallel vertical sidewalls extending above and below the decking sections.

7. An adjustable circumference fractionation tray for installation in a vertical fractionation column having an upper first end and lower second end and used for the separation of volatile chemical compounds by fractional distillation, which tray comprises:

a) a first and a second trough-shaped downcomer;

b) two movable perforated decking sections mounted on supports fastened to the downcomers and located between the first and second downcomers, with the decking sections having positioning slots located in portions of the decking sections which overlies the supports; and c) a retention mechanism which locks the decking sections in place along the supports.

8. The tray of claim 7 further comprising decking sections located on the periphery of the tray and movable in a direction perpendicular to the downcomer sidewall.

9. An apparatus for performing fractional distillation, which apparatus comprises:

a) a vertical enclosed column and a plurality of fractionation trays suspended in the column, with each tray comprising at least two parallel downcomers;

b) decking support means attached to the downcomer;

c) planar perforated decking panels located between two parallel downcomers and resting upon the decking support means, with at least one of the decking panels being a movable decking panel which is configured to allow movement in the direction of the major axis of the downcomers; and d) fasteners which retain the movable decking panel in place, with the outermost decking panels having an edge facing the inner surface of the column and separated from the inner surface of the column by an irregular unsealed gap.

10. The column of claim 9 further comprising movable decking panels located at the edge of the tray adjacent the outermost downcomer and movable in a direction perpendicular to the downcomer.

11. The column of claim 9 wherein the fasteners which retain the movable decking panel comprise a clamp holding the edge of the movable decking panel against a support extending along the downcomer.

12. A method of installing trays in a fractional distillation column, which method comprises:

a) installing a first tray in the column, with the first tray being supported, at least in part, by a ring attached to the inner surface of the column;

b) installing a second tray in the column by assembling the second tray within the column, with the entire second tray being supported only by the first tray and with both the first and the second trays comprising slideable horizontal decking sections located between and adjacent a plurality of parallel downcomers;

c) adjusting the shape of the periphery of the second tray to conform to the shape of the column by sliding decking portions toward or away form the column wall; and d) fixing the decking portions in place.

* * * * *